3,335,029
POLYESTER COATED WITH THE REACTION PRODUCT OF A VINYLIDENE CHLORIDE COPOLYMER AND A POLYEPOXIDE AND PROCESS FOR PRODUCING THE SAME
Roy L. Holben, Wilmington, Del., assignor to Thiokol Chemical Corporation, Bristol, Pa., a corporation of Delaware
No Drawing. Filed July 3, 1963, Ser. No. 292,712
8 Claims. (Cl. 117—138.8)

The present invention relates to a novel composition and process for the coating of polyester materials. More particularly, the present invention relates to a novel solution system containing a polyepoxide and a copolymer of vinylidene chloride and an $\alpha,\beta$ unsaturated carboxylic acid or an anhydride of said acid which may be used to coat polyester substrates. By polyester, according to the present invention, it is meant the reaction products of polybasic acids and polyhydric alcohols.

An object of the present invention is to provide a composition with which coatings can be readily and economically imparted to polyester substrates, and in particular those polyester substrates which are employed as flexible films.

Another object of the present invention is to provide such coatings for polyester substrates as are clear and have excellent solvent and grease resistance as well as good adhesion to the substrate and good vapor impermeability properties and heat sealable characteristics.

Another object of the present invention is to provide a process whereby polyester substrates may be readily coated with such compositions.

Polyester films, such as those made of poly(alkylene terephthalate) and poly(1,4 cyclohexylenedimethylene terephthalate), are used extensively in the packaging industry for applications such as the packaging of food, tobacco products, items of apparel, etc. and as such should possess certain properties such as good moisture and odor impermeability, grease and oil resistance, heat sealability, etc. The polyester film coatings as herein mentioned would impart to these films the properties required for use as packaging material which properties are usually not inherent in the film itself. Such coatings also must possess a high degree of adhesion to the substrate material. The coatings described in the present invention, moreover, possess such adhesion characteristics without the use of anchoring agents as will be discussed below.

Polymeric film coating materials known to the art include vinylidene chloride/acrylonitrile copolymers, vinylidene chloride/alkyl acrylate copolymers and vinylidene $\alpha,\beta$ unsaturated carboxylic acid copolymers such as are disclosed in U.S. 2,334,236; 2,748,027; 2,762,720; 2,805,- 963; 2,819,984; 3,034,929; 3,037,868; 3,039,986 and Great Britain 889,564. In order to coat film substrates with these type polymers, however, it is often necessary to first treat the film with an anchoring agent whereby a useful degree of adhesion between the coating and the substrate may be obtained. As mentioned above, the present invention produces excellent adhesion without the use of said anchoring agents.

It has now been unexpectedly found, according to the present invention, that polyester substrates may be readily coated with a clear coating which has good adhesion to the polyester substrate, good solvent and grease resistance, good heat sealable properties and good vapor impermeability if the substrate is coated with a solution containing:

(a) at least one polyepoxide compound and
(b) at least one copolymer of vinylene chloride and at least one $\alpha,\beta$ unsaturated carboxylic acid or an anhydride of such acids and the polyepoxide is then reacted with the copolymer to form a crosslinked reaction product concurrent with and/or subsequent to the removal of the solvent medium.

To our knowledge, the present invention represents the first successful attempt by those in the art to use an epoxy crosslinked, vinylidene chloride/$\alpha,\beta$ unsaturated carboxylic acid copolymer for coating polyester substrates, although epoxy crosslinked carboxyl group containing copolymers have been used extensively for other purposes: i.e., U.S. 2,604,457, 2,604,463, 2,604,464, 2,965,602, 2,662,870, 2,759,901, 2,798,861, 2,969,402, 2,985,616, and 3,027,357; Canadian 534,001, 534,261 and 569,430 and Great Britain 681,031 and 896,821.

The vinylidene chloride copolymers of the present invention are relatively low molecular weight particulate materials which contain about 75 to 95 and preferably about 85 mol percent of vinylidene chloride and about 5 to 25 and preferably about 15 mol percent of at least one unsaturated $\alpha,\beta$ carboxylic acid such as acrylic, methacrylic, itaconic and crotonic acids or anhydrides of such acids. They are random coplymers which are soluble in selected solvents such as tetrahydrofuran, ethyl acetate, acetone, methyl ethyl ketone, methyl isobutyl ketone, dimethyl formamide and dioxane and cosolvent systems such as those containing at least 50% by volume of tetrahydrofuran and at least one solvent diluent such as toluene and methylene chloride.

The copolymers are preferably formed by means of a free radical polymerization reaction using about 0.1 to 4% by weight of a catalyst such as azobisisobutyronitrile or benzoyl peroxide. The reaction is preferably conducted in solution in a solvent such as hexane, methylisobutylketone, methyl ethyl ketone, acetone or 50/50 (by volume) acetone/toluene. The polymerization reaction may also be conducted using suspension and emulsion polymerization techniques. The copolymers produced should preferably be freed of heavy metal contaminants, such as iron, for stability purposes.

The polyepoxides which may be used in the novel compositions and processes of the present invention are those which contain an average of more than one epoxide

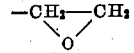

group per molecule and which are soluble in the desired solvent. Generally speaking, all the polyepoxide materials commercially available today may be used in the compositions and processes of the present invention, whether they are solid or liquid materials. The polyepoxy materials which can be cured with the above described copolymers are preferably those materials which have an average epoxy functionality of more than one and preferably they are materials which contain an average of at least approximately two epoxide groups per molecule of the polyepoxy material. The position of the epoxide groups in the polyepoxy material is not critical. For instance, if the polyepoxy material is essentially linear in structure the epoxide groups may be in a terminal position or they may be positioned intermediately and/or randomly along the linear structure. Polyepoxy materials which may be cured with the above defined copolymers include the following types of materials:

(1) Essentially linear type such as

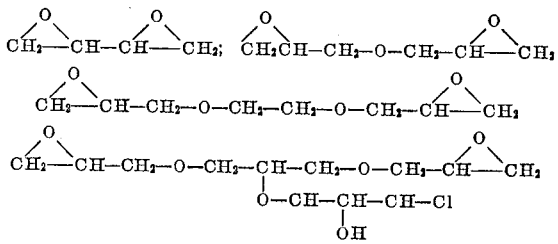

homopolymers and copolymers of glycidyl acrylate and preferably a copolymer of vinylidene chloride and glycidyl acrylate and the epoxidized polybutadiene materials such as those which have an epoxide functionality of four or more and which are sold by Food Machinery Corporation under the designation "Oxiron" resins (i.e., "Oxiron 2000," "Oxiron 2001" and "Oxiron 2002").

(2) Bisphenol A/epichlorohydrin type which are aromatic in nature and which include those sold by the Thiokol Chemical Corporation under the trademark designation "Tipox" (i.e., "Tipox A"; "Tipox B"; "Tipox C"), those sold by the Shell Chemical Company under the designation "Epon" resins, i.e., "Epon 828" and those sold by Union Carbide Chemicals Company under the designation "Bakelite ERL" resins.

(3) Cyclo aliphatic type which includes those sold by Union Carbide Chemicals Company under the designation "Unox" resins (i.e., "Unox 206" which is epoxy ethyl-3,4-epoxy cyclohexane, "Unox 201" which is 3,4-epoxy-6 - methylcyclohexylmethyl-3,4-epoxy-6-methylcyclohexanecarboxylate, "Unox 221" which is 3,4-epoxy-cyclohexylmethyl - 3,4 - epoxy cyclohexane carboxylate and "Unox 289" which is bis (3,4-epoxy-6-methylcyclohexylmethyl) adipate.

(4) Resorcinol diglycidyl ether type which includes those sold by Koppers Chemical Corporation under the designation "Kopoxite" resins (i.e., "Kopoxite 159").

(5) Epoxy novalak type (alkyl novalak resins) which is a phenolic/epoxy type system and which includes the resins sold by Dow Chemical Corporation under the designation "Dow Epoxy Novalak 438" or "DEN 438–EK 85" which contains 85% of the resin and 15% methyl ethyl ketone as a solvent and the resins sold by Koppers Chemical Corporation under the designation "KER" resins (i.e., "KER 357A" and "KER 955A").

(6) Epoxidized fatty acid resins including the Epoxol materials sold by Swift and Company such as "Epoxol 9–5" (epoxidized linseed oil) and "Epoxol 7–4" (epoxidized soy bean oil); the "Flexol" resins sold by Union Carbide Chemicals Company, such as "Flexol EP8" (2-ethyl hexyl epoxy tallate), "Flexol EPO" (epoxidized soy bean oil) and "Flexol TPO" (epoxidized soy bean oil) and "Paraplex G62" (epoxidized soy bean oil) sold by Rohm and Haas.

(7) Epoxidized silicone oil types such as that marketed by Dow Corning under the trade name "Epoxy Silicone QZ," e.g., Epoxy Silicone QZ8–0914.

For the purpose of obtaining the approval of the Food and Drug Administration of the Department of Health, Education and Welfare for the polyester coating compositions of the present invention in food packaging applications, the epoxidized fatty acid type polyepoxides are the preferred of such compounds. The Unox resins, and in particular the Unox 201 and Unox 289 type resins are preferred of the polyepoxide compounds for room temperature curing applications. The higher the functionality of the polyepoxide compound, the tighter the cure that is obtained usually, all other factors remaining the same and for some applications such higher functional poly-epoxide materials are preferred. The use of glycidyl acrylate copolymers, such as, a copolymer of vinylidene chloride and glycidyl acrylate is preferred in those applications where a less plasticized coating is desired for better coating surface properties.

The polyepoxide/copolymer solution systems of the present invention offer unique handling and processing advantages to the trade. They are essentially one package curing systems and are stable upon storage for extended periods of time. Their solids content can be readily varied to meet the need for various types of applications. Those in the trade seem to prefer a solution having a solids content of about 15 to 35% by weight. By solids content it is meant, the percent by weight of those components of the solutions which are not solvents, even though one or more of the other components, such as the polyepoxide materials, may be liquid under normal conditions. The solution nature of these systems also provides for a facile incorporation therein of adjuvant materials such as pigments, dyes, delustrants, plasticizers, waxes, fillers, stabilizers, etc., when desired. Solvents which may be used in the preparation of the coating solution of the present invention include methyl ethyl ketone, tetrahydrofuran, methyl isobutyl ketone and solvent mixtures containing no more than about 75% toluene and the remainder tetrahydrofuran, methyl ethyl ketone and/or ethyl acetate. The preferred solvents are methyl ethyl ketone or a mixture of toluene with methyl ethyl ketone or ethyl acetate.

In coating polyester substrates according to the present invention, a solution containing the polyepoxide and the copolymer is applied to the substrate on one or more faces or sides thereof as desired, so as to provide each face or side of the substrate being coated with a film which is at least about 0.05 and is preferably about 0.1 to 1.0 mil thick after the removal of the solvent therefrom. The coatings may be applied by any of the commonly used dipping, brushing, roller coating, etc., techniques known to the art. The viscosity of the coating may be varied to suit the manner of application by adjusting the solids content of the coating solution. The solvent is then removed preferably at elevated temperatures of about 120° C. to 130° C. under forced draft conditions. At these temperatures the removal of the solvent and the crosslinking of the copolymer and the polyepoxide can be accomplished in abolt one minute. The time required for the removal of the solvent and the crosslinking reaction can be adjusted by varying the temperature. At room temperature the process could take up to 24 hours while at about 200° C. the reaction would proceed in a matter of seconds. The crosslinking reaction involves the reaction of the carboxyl groups of the copolymer with the epoxy groups of the polyepoxide. About 0.01 to 2.5 and perefarbly about 0.1 to 1.0 mol of epoxide moieties should be provided per mol of carboxyl moieties to insure adequate crosslinking sites. Catalysts such as tertiary amines, $BF_3$ and $BF_3$ complexes may be used to facilitate the crosslinking reaction when using certain of the polyepoxide materials such as the epichlorohydrin/bisphenol A type. Useful products may be obtained with these polyepoxides, however, without the use of such catalysts. The use of increased amounts of the longer chained (aliphatic/fatty acid) type polyepoxides tends to produce tacky and self-adhering coatings which are particularly useful for some packaging applications.

The coatings produced according to the present invention are normally crosslinked and/or chain extended into a very high molecular weight form with the application of heat, yet they retain very excellent heat sealing properties. If a coating material does not have heat sealing properties, its utility in the field of packaging coatings would be sharply curtailed since heat sealability of the coated packaging material is a necessary prerequisite to its universal utility as a wrapping material.

The coatings prepared according to the present invention have much better solvent, grease and scratch resistant properties and are much more resistant to the passage of moisture therethrough than the coatings presently available for coating polyester substrates largely due to the crosslinked and/or chain extended nature of the coatings of the present invention. There are, to our knowledge, no crosslinked plastic based coatings for polyester substrates commercially available today, all of said substrate coating materials presently available to the art being thermoplastic in nature.

The carboxylic acid moieties supply the copolymers of the present invention, for the most part, with its solubility properties in addition to supplying the copolymer with the carboxyl groups needed to subsequently anchor the coating to the polyester substrate and crosslink with the epoxy groups of the polyepoxide compounds. The solubility of the copolymers can also be varied, if desired, by varying the molecular weight of the copolymer. The vinylidene chloride units of the copolymer help to supply the needed vapor impermeability and grease resistant properties to the crosslinked coating. The polyepoxide materials supply the epoxide groups needed to crosslink the copolymer via its carboxyl groups. It is the crosslinked and/or chain extended nature of the coatings of the present invention which provides its excellent solvent resistant properties. The polyepoxide materials also probably imparts adhesive and plasticized properties to the cured coating which is particularly useful in a flexible packaging application. The liquid polyepoxides also act as cosolvents for the copolymer. It can be readily seen, therefore, that the novel coating compositions of the present invention provide those in the art with a versatile coating system, the components and/or amounts of the components of which can be readily changed so as to provide for the needs of a vast variety of end use coating applications.

The following examples are merely illustrative of the present invention and are not intended as a limitation upon the scope thereof.

EXAMPLES 1–15

*Preparation of the vinylidene chloride/acrylic acid copolymer*

Among the vinylidene chloride copolymers which may be used to form part of the curable compositions of the present invention are those of vinylidene chloride ($VCl_2$) and acrylic acid (AA) Curable copolymers made from those monomers were prepared by solution polymerization as illustrated in Tables I and II below. They represent a wide range of compositions, produced using several solvent systems, e.g., solvent A=methylisobutylketone; solvent B=acetone; solvent C=1:1 vol./vol. mixture of acetone and toluene, solvent D=methylethyl ketone and several free radical polymerization initiators, e.g., initiator A=azo-bis-butyronitrile; initiator B=benzoyl peroxide, under various polymerization conditions of temperature and time, to provide reactive copolymers at various percentages of conversion of the monomers. In preparing these copolymers, the respective initiators were dissolved in the solvent used and the monomers were then added to the initiator solution. The reactions were conducted under nitrogen in a sealed reaction vessel under autogenous pressure.

TABLE I

| Ex. | Charge | | Charge, Mol Percent $VCl_2$/AA | Initiator | | Solvent | |
|---|---|---|---|---|---|---|---|
| | $VCl_2$ g. | AA g. | | In Grams | Type | In ml. | Type |
| 1 | 63 | 25 | 65/35 | 2 | A | 150 | A |
| 2 | 73 | 17 | 75/25 | 2 | A | 150 | A |
| 3 | 155 | 29.6 | 80/20 | 4 | A | 240 | A |
| 4 | 78 | 14 | 80/20 | 2 | A | 150 | A |
| 5 | 78 | 14.4 | 80/20 | 2 | A | 150 | A |
| 6 | 3,220 | 496 | 83/17 | 80 | A | 6,000 | D |
| 7 | 161 | 25 | 83/17 | 4 | A | 300 | A |
| 8 | 161 | 24.5 | 83/17 | 4 | A | 300 | C |
| 9 | 161 | 24.5 | 83/17 | 4 | A | 300 | D |
| 10 | 161 | 24.5 | 83/17 | 6 | B | 300 | C |
| 11 | 161 | 24.5 | 83/17 | 6 | B | 300 | D |
| 12 | 83 | 10.8 | 85/15 | 2 | A | 150 | D |
| 13 | 83 | 10.8 | 85/15 | 2 | A | 150 | A |
| 14 | 171 | 17 | 88/12 | 4 | A | 300 | A |
| 15 | 87 | 7.2 | 90/10 | 2 | A | 150 | A |

TABLE II

| Ex. | Reaction | | | Resin Product | |
|---|---|---|---|---|---|
| | Time, Hrs. | Temp., °C. | Conversion Percent | Mol Percent $VCl_2$/AA | g. eq. COOH/100 g. Resin |
| 1 | 5 | 60 | 57 | 72/28 | 0.32 |
| 2 | 4 | 60 | | 79/21 | 0.22 |
| 3 | 16 | 65 | 85 | 82/18 | 0.19 |
| 4 | 4 | 60 | 32 | 83/17 | 0.18 |
| 5 | 17 | 60 | 85 | 83/17 | 0.19 |
| 6 | 6 | 65 | 61 | 83.9/16.1 | 0.173 |
| 7 | 3 | 65 | 53 | 84/16 | 0.17 |
| 8 | 5 | 65 | 63 | 84/16 | 0.17 |
| 9 | 5 | 65 | 61 | 85/15 | 0.161 |
| 10 | 5 | 65 | 33 | 85/15 | 0.161 |
| 11 | 5 | 65 | 38 | 86/14 | 0.149 |
| 12 | 4 | 60 | 33 | 87/13 | 0.13 |
| 13 | 1 | 85 | 55 | 87/13 | 0.14 |
| 14 | 3 | 65 | 55 | 90/10 | 0.11 |
| 15 | 1 | 85 | 56 | 91/9 | 0.10 |

EXAMPLES 16–31

*Preparation and characteristics of vinylidene chloride/acrylic acid/polyepoxide coated polyester substrates*

In the following examples listed in Table III, the polyester employed as substrate materials were:

A. Poly (1,4-cyclohexylene dimethylene terephthalate) and

B. Poly (alkylene terephthalate)

The vinylidene chloride/acrylic acid copolymer used in these examples was prepared as in Example 13.

In order to impart a wet thickness coating of 3 mils to the substrate, the coating solutions, as indicated in Table III, were hand coated on the polyester substrates. These coated films were then cured at 250° F. in a forced draft oven for one minute. Where a mixed solvent system is indicated in the table, the solvents are present in a one to one ratio. Heat was used to assist the copolymer and polyepoxide into solution in the indicated solvent. In all cases the solute and solvent content was adjusted to give approximately 15% solids content. The heat sealability test was conducted using 60 lbs. pressure at 300° F. for ½ second. The adhesion test was performed by scoring the coating with a razor and applying pressure sensitive tape into the cut areas and surrounding coated surface. The tape was then quickly removed by pulling. When no delamination was observed, the coated film was given a good rating, when slight delamination was observed, a fair rating was given. Good clarity was exhibited by a perfectly clear coating and substrate while a slightly hazy coated film was deemed fair.

TABLE III

| Ex. | Polyester Type | Copolymer (parts by weight) | Epoxy Type | Epoxy Parts by Weight | Solvent Type | Solvent Parts by Weight | Ratio of Epoxy to—COOH | Adhesion | Clarity | Heat Sealability | Peel Test (Mod. ASTM) Grams/Inch |
|---|---|---|---|---|---|---|---|---|---|---|---|
| 16 | A | 10 | (1) | 1.7 | THF | 66 | 0.5/1.0 | Good | Good | Good | 289.0 |
| 17 | B | 10 | (1) | 1.7 | THF | 66 | 0.5/1.0 | Fair | Fair | do | 665.0 |
| 18 | A | 10 | (1) | 1.7 | TOL/THF | 66 | 0.5/1.0 | Good | do | do | 76.0 |
| 19 | B | 10 | (1) | 1.7 | TOL/THF | 66 | 0.5/1.0 | do | do | do | 302.0 |
| 20 | A | 10 | (2) | 2.3 | DMF | 69 | 1.0/1.0 | do | do | do | 84.0 |
| 21 | B | 10 | (2) | 2.3 | DMF | 69 | 1.0/1.0 | do | do | do | 16.7 |
| 22 | A | 10 | (2) | 2.3 | MEK/ETAC | 69 | 1.0/1.0 | do | Good | do | 121.0 |
| 23 | B | 10 | (2) | 2.3 | MEK/ETAC | 69 | 1.0/1.0 | do | do | do | 73.0 |
| 24 | A | 10 | (3) | 2.1 | MEK/ETAC | 70 | 0.63/1.0 | do | do | do | 76.0 |
| 25 | B | 10 | (3) | 2.1 | MEK/ETAC | 70 | 0.63/1.0 | do | Fair | do | 167.0 |
| 26 | A | 10 | (3) | 2.1 | DMF | 70 | 0.63/1.0 | do | do | do | 152.0 |
| 27 | B | 10 | (3) | 2.1 | DMF | 70 | 0.63/1.0 | do | do | do | 302.0 |
| 28 | A | 10 | (4) | 0.37 | THF | 59 | 0.13/1.0 | do | do | do | 181.0 |
| 29 | B | 10 | (4) | 0.37 | THF | 59 | 0.13/1.0 | do | do | do | 424.0 |
| 30 | A | 10 | (4) | 0.37 | TOL/THF | 59 | 0.13/1.0 | do | Good | do | 212.0 |
| 31 | B | 10 | (4) | 0.37 | TOL/THF | 59 | 0.13/1.0 | do | do | do | 196.0 |

Epoxy types:
(1) Tipox B
(2) Unox 221
(3) Epon 1001
(4) DCQ 280903 (an epoxidized silicone oil)

Solvent abbreviations:
THF Tetrahydrofuran
DMF Dimethylformamide
TOL Toluene
MEK Methyl Ethyl Ketone
ETAC Ethyl Acetate Polyester type:
A. Poly (1,4-cyclohexylene dimethylene terephthalate)
B. Poly (alkylene terephthalate)

EXAMPLE 32

*Barrier qualities of vinylidene chloride/acrylic acid/polyepoxide coating*

Coatings used in the practice of the present invention exhibit excellent resistance to attack by solvents and corrosive chemicals such as is shown in Table IV below.

Coating solutions comprising 100 parts by weight of an 84.5/15.5 mol ratio, $VCl_2$/AA copolymer produced as in Examples 1 to 15, 80 parts by weight of Tipox A polyepoxide, 3 parts by weight of boron trifluoride monoethylamine and 183 parts by weight of methyl ethyl ketone were prepared, spread onto a glass cloth substrate and permitted to dry. Two layers of the thus coated substrate, with coated sides in face to face contact, were subjected to 1000 p.s.i. and 300° F. for one hour. The laminated product obtained has a resin content of 29% by weight; it was then immersed in various liquid solvents and corrosive chemicals for one week (7 days) at 70° F. The tests conducted are described in ASTM D543-56T procedure, and the results obtained are as listed in Table IV.

TABLE IV

| Immersion Medium | Cured Coating Percent Weight Increase | Cured Coating Percent Thickness Increase |
|---|---|---|
| 30% $H_2SO_4$ | 1.42 | 5.86 |
| 3% $H_2SO_4$ | 0.94 | 6.72 |
| 10% NaOH | 0.51 | (¹) |
| 1% NaOH | 1.46 | 0.67 |
| 95% Ethanol | 2.84 | 7.46 |
| 50% Ethanol | 1.53 | (¹) |
| Acetone | 10.25 | 21.1 |
| Ethyl Acetate | 13.12 | 26.3 |
| $CCl_4$ | 0.533 | (¹) |
| Toluene | 3.45 | 7.86 |
| Heptane | 0.29 | (¹) |
| 10% NaCl | 0.97 | (¹) |
| Phenol | 6.5 | 12.3 |
| $H_2O$ | 0.3 | (¹) |

¹ No change.

In general, optimum adhesion coating to substrates in the present invention is obtained if the coating is applied to the sides of the substrate which are etched or roughened by physical, electrical (U.S. 3,018,189) or chemical means to provide a better anchoring surface for the coating.

The poly (alkylene terephthalate) substrates, as used in this invention, are the reaction products of one or more saturated dibasic phthalic anhydrieds and/or acids such as phthalic anhydride, isophthalic acid, tetrahydrophthalic anhydride, hexahydrophthalic anhydride, endomethylene tetrahydrophthalic anhydride, tetrachlorophthalic anhydride and hexachloroendomethylene tetrahydrophthalic acid, and one or more lower alkylene glycols such as ethylene glycol, propylene glycol, butylene glycol, diethylene glycol and dipropylene glycol.

I claim:

1. As an article of manufacture a poly (alkylene terephthalate) substrate coated on at least one surface thereof with the reaction product of
   (A) at least one copolymer essentially consisting of about 75 to 95 mol percent of vinylidene chloride and about 5 to 25 mol percent of at least one acid material selected from the group consisting of α,β unsaturated, aliphatic carboxylic acids and their anhydrides, and
   (B) at least one polyepoxide in an amount such as to provide about 0.01 to 2.5 mols of epoxide groups per mol of carboxyl groups present in said copolymer.

2. An article as in claim 1 in which said poly (alkylene terephthalate) is poly (1,4-cyclohexylene-dimethyl terephthalate).

3. An article as in claim 1 in which said polyepoxide contains an average of more than one epoxide group per molecule.

4. An article as in claim 1 in which said acid is acrylic acid.

5. A process for producing a vapor impermeable poly (alkylene terephthalate) substrate comprising applying to at least one surface of said substrate a solution containing
   (A) at least one copolymer essentially consisting of about 75 to 95 mol percent of vinylidene chloride and about 5 to 25 mol percent of at least one acid material selected from the group consisting of α,β unsaturated, aliphatic carboxylic acids and their anhydrides, and
   (B) at least one polyepoxide in an amount such as to provide about 0.01 to 2.5 mols of epoxide groups per mol of carboxyl groups present in said copolymer, removing the solvent medium from said solution, and crosslinking said copolymer with said polyepoxide whereby said crosslinked copolymer forms a coating on said substrate.

6. A process as in claim 5 in which said poly (alkylene terephthalate) is poly (1,4-cyclohexylene-dimethylene terephthalate), 7. A process as in claim 5 in which said polyepoxide contains an average of more than one epoxide group per molecule.

8. A process as in claim 5 in which said acid material is acrylic acid.

References Cited

UNITED STATES PATENTS

| | | | |
|---|---|---|---|
| 2,604,463 | 7/1952 | Bilton et al. | 260—80.5 |
| 2,805,963 | 9/1957 | Gaylord | 117—138.8 |
| 3,058,939 | 10/1962 | Meier | 117—138.8 |
| 3,102,823 | 9/1963 | Manasia et al. | 117—21 |
| 3,190,764 | 6/1965 | Cardina | 117—138.8 |
| 3,207,718 | 9/1966 | Zimmerman et al. | 117—161 |
| 3,231,412 | 1/1966 | Pruitt et al. | 117—138.8 |
| 3,236,683 | 2/1966 | Berenbaum et al. | 117—132 |
| 3,245,925 | 4/1966 | Watson | 260—20 |
| 3,257,345 | 6/1966 | Bond et al. | 260—22 |

WILLIAM D. MARTIN, *Primary Examiner.*

MURRY KATZ, *Examiner.*

W. D. HERRICK, *Assistant Examiner.*

UNITED STATES PATENT OFFICE
CERTIFICATE OF CORRECTION

Patent No. 3,335,029                                                   August 8, 1967

Roy L. Holben

It is hereby certified that error appears in the above numbered patent requiring correction and that the said Letters Patent should read as corrected below.

Column 4, line 46, for "abolt" read -- about --; column 8, line 49, for "dimethyl" read -- dimethylene --.

Signed and sealed this 23rd day of July 1968.

(SEAL)
Attest:

Edward M. Fletcher, Jr.                                                 EDWARD J. BRENNER
Attesting Officer                                                            Commissioner of Patents